(12) United States Patent
De Gans et al.

(10) Patent No.: US 9,353,289 B2
(45) Date of Patent: May 31, 2016

(54) COATING COMPOSITION COMPRISING POLYSILOXANE QUATS

(71) Applicant: EVONIK INDUSTRIES AG, Essen (DE)

(72) Inventors: Berend-Jan De Gans, Mulheim an der Ruhr (DE); Sascha Herrwerth, Essen (DE); Alexandra Trambitas, Essen (DE); Verena Dahl, Cologne (DE); Sylvia Hicking, Essen (DE); Giuseppe Giuffre, Oberhausen (DE)

(73) Assignee: Evonik DeGussa GmbH, Essen (DE)

( * ) Notice: Subject to any disclaimer, the term of this patent is extended or adjusted under 35 U.S.C. 154(b) by 0 days.

(21) Appl. No.: 14/467,586

(22) Filed: Aug. 25, 2014

(65) Prior Publication Data

US 2015/0073069 A1 Mar. 12, 2015

(30) Foreign Application Priority Data

Sep. 11, 2013 (DE) .......................... 10 2013 218 134

(51) Int. Cl.
| | | |
|---|---|---|
| *C09D 183/08* | (2006.01) | |
| *C08K 5/544* | (2006.01) | |
| *C09D 7/12* | (2006.01) | |
| *C09D 163/00* | (2006.01) | |
| *C09D 133/04* | (2006.01) | |
| *C09D 175/04* | (2006.01) | |
| *C09D 161/06* | (2006.01) | |
| *C09D 161/28* | (2006.01) | |
| *C08G 77/26* | (2006.01) | |
| *C08G 77/388* | (2006.01) | |

(52) U.S. Cl.
CPC .............. *C09D 183/08* (2013.01); *C08K 5/544* (2013.01); *C09D 7/125* (2013.01); *C09D 133/04* (2013.01); *C09D 161/06* (2013.01); *C09D 161/28* (2013.01); *C09D 163/00* (2013.01); *C09D 175/04* (2013.01); *C08G 77/26* (2013.01); *C08G 77/388* (2013.01)

(58) Field of Classification Search
None
See application file for complete search history.

(56) References Cited

U.S. PATENT DOCUMENTS

| | | | |
|---|---|---|---|
| 6,207,141 | B1 | 3/2001 | Pyles |
| 7,361,777 | B2 | 4/2008 | Herrwerth et al. |
| 7,442,666 | B2 | 10/2008 | Herrwerth et al. |
| 7,598,334 | B2 | 10/2009 | Ferenz et al. |
| 7,605,284 | B2 | 10/2009 | Brueckner et al. |
| 7,727,599 | B2 | 6/2010 | Doehler et al. |
| 7,834,122 | B2 | 11/2010 | Ferenz et al. |
| 7,893,128 | B2 | 2/2011 | Busch et al. |
| 7,964,694 | B2 | 6/2011 | Ferenz et al. |
| 8,034,848 | B2 | 10/2011 | Landers et al. |
| 8,084,633 | B2 | 12/2011 | Herrwerth et al. |
| 8,172,936 | B2 | 5/2012 | Herrwerth et al. |
| 8,247,525 | B2 | 8/2012 | Schubert et al. |
| 8,268,939 | B2 | 9/2012 | Ebbrecht et al. |
| 8,466,248 | B2 | 6/2013 | Meyer et al. |
| 8,617,529 | B2 | 12/2013 | Herrwerth et al. |
| 8,685,376 | B2 | 4/2014 | Czech et al. |
| 8,772,423 | B2 | 7/2014 | de Gans et al. |
| 8,778,319 | B2 | 7/2014 | Herrwerth et al. |
| 2005/0136269 | A1 | 6/2005 | Doehler et al. |
| 2006/0269506 | A1* | 11/2006 | De Caire ................. A61K 8/06 424/70.122 |
| 2007/0059539 | A1 | 3/2007 | Doehler et al. |
| 2007/0299231 | A1 | 12/2007 | Doehler et al. |
| 2009/0007483 | A1 | 1/2009 | Hansel et al. |
| 2010/0034765 | A1 | 2/2010 | Herrwerth et al. |
| 2010/0036011 | A1 | 2/2010 | De Gans et al. |
| 2010/0210445 | A1 | 8/2010 | von Rymon Lipinski et al. |
| 2012/0027704 | A1 | 2/2012 | Henning et al. |
| 2013/0259821 | A1 | 10/2013 | Henning et al. |
| 2013/0267403 | A1 | 10/2013 | von Rymon Lipinski et al. |
| 2013/0331592 | A1 | 12/2013 | Hartung et al. |
| 2014/0134125 | A1 | 5/2014 | Dahl et al. |
| 2014/0175685 | A1* | 6/2014 | Huang ............. B29D 11/00192 264/2.6 |

FOREIGN PATENT DOCUMENTS

| | | |
|---|---|---|
| DE | 36 28 048 A1 | 2/1987 |
| DE | 43 00 267 C1 | 4/1994 |
| DE | 10114689 A1 | 9/2002 |
| DE | 102009008950 A1 | 8/2010 |
| DE | 10 2009 002477 A1 | 10/2010 |
| DE | 10 2010 031178 A1 | 1/2012 |
| EP | 080714 A2 | 6/1983 |
| EP | 228003 A1 | 7/1987 |
| EP | 0282720 A2 | 9/1988 |
| EP | 0294642 A2 | 12/1988 |
| EP | 0530974 A1 | 3/1993 |
| EP | 617607 A1 | 10/1994 |
| EP | 634431 A1 | 1/1995 |
| JP | 2002-308991 A | 10/2002 |

(Continued)

OTHER PUBLICATIONS

Machine translation of DE 43 30 267 (Apr. 1994).*

(Continued)

*Primary Examiner* — Marc Zimmer

(74) *Attorney, Agent, or Firm* — Frommer Lawrence & Haug LLP

(57) ABSTRACT

The present invention provides a curable coating composition comprising at least one linear or cyclic polysiloxane containing at least one quaternary ammonium group, a process for producing the aforesaid coating composition, and a process for producing a coating with the curable coating composition, and also the coatings and coating compositions themselves that are obtainable by the processes described.

8 Claims, 1 Drawing Sheet

(56) References Cited

FOREIGN PATENT DOCUMENTS

| WO | WO-9215405 | A1 | | 9/1992 |
|----|------------|-----|---|--------|
| WO | WO 94/09011 | | * | 4/1994 |
| WO | WO-9408556 | A1 | | 4/1994 |
| WO | WO-0182879 | A2 | | 11/2001 |
| WO | WO-02/10254 | A1 | | 2/2002 |
| WO | WO 2009/033399 | | * | 3/2009 |
| WO | WO 2011/147959 | | * | 12/2011 |
| WO | WO-2012130711 | A2 | | 10/2012 |
| WO | WO 2013/096211 | | * | 6/2013 |

OTHER PUBLICATIONS

Search Report issued in corresponding European application No. 14181517.5 dated Nov. 5, 2014.

Kittel, H; Lehrbuch der Lacke und Beschichtungen, Part 3: "Bindemittel für wasserverdünnbare Systeme" (2001) second edition.

* cited by examiner

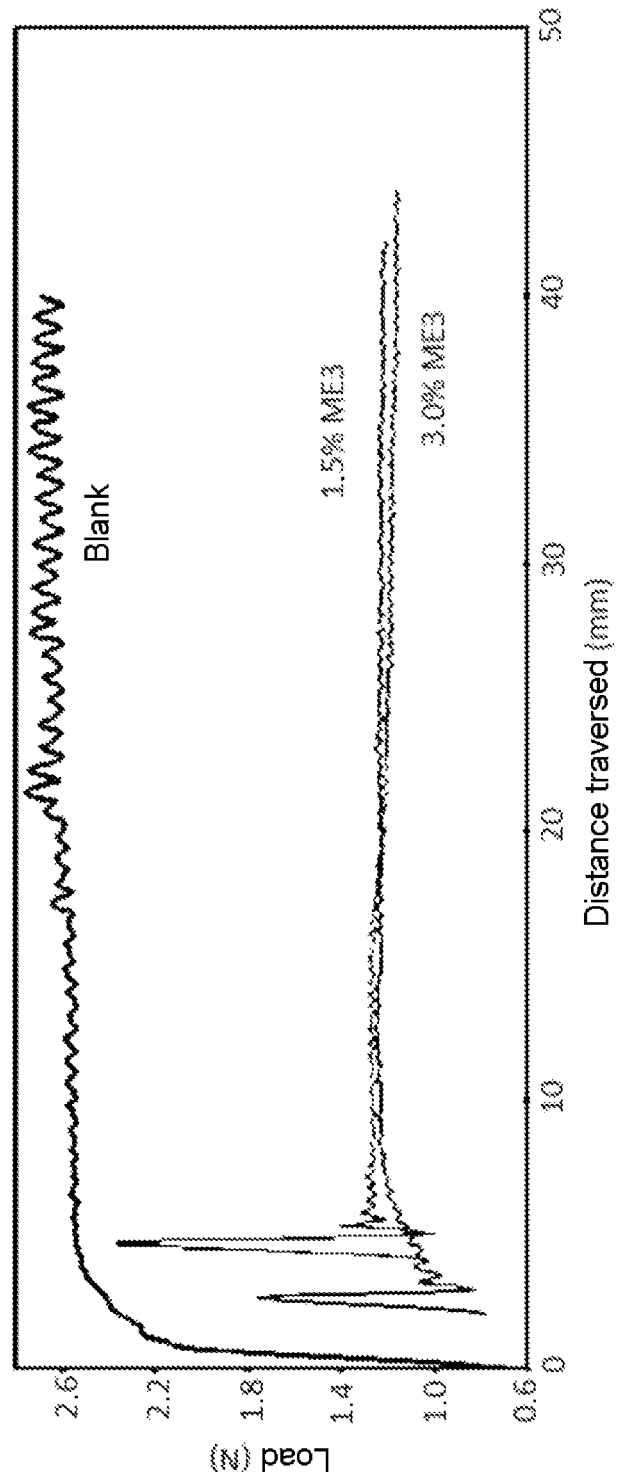

COATING COMPOSITION COMPRISING POLYSILOXANE QUATS

The present application claims priority from German Patent Application No. DE 10 2013 218 134.5 filed on Sep. 11, 2013, the disclosure of which is incorporated herein by reference in its entirety.

FIELD OF THE INVENTION

The present invention relates to a curable coating composition comprising at least one linear or cyclic polysiloxane containing at least one quaternary ammonium group, a process for producing the aforesaid coating composition, and a process for producing a coating with the curable coating composition, and also the coatings and coating compositions themselves that are obtainable by the processes described.

BACKGROUND OF THE INVENTION

The use of polysiloxanes comprising quaternized nitrogen groups is already long-established, especially in cosmetic applications. They serve there in general, as part of wash-off formulations, as conditioning agents for skin and hair.

Thus, for example, EP0282720 and EP0294642 describe cationic polysiloxanes of this kind, in which the quaternary functions are bonded terminally to the polysiloxane, in cosmetic applications. Such compounds offer advantages in terms of their effect as conditioning agents not only for hair and textiles but also for hard surfaces. The use of such compounds in cosmetic formulations has also been described in EP0530974, EP617607, EP 080714, WO 2001082879 and U.S. Pat. No. 6,207,141.

The use of polysiloxanes per se in coating compositions, such as paints and varnishes, for example, is likewise already long-established and, indeed, widespread. Polysiloxanes are used as defoamers and deaerating agents, as wetting agents and as a lubricity additive. The lubricity additive utility derives from the addition reaction of the polysiloxane with the surface of the coating.

Adding minimal amounts of conventional polysiloxane, however, may lead to defects in the dry coating film, which are known to the skilled person as "craters". Consequently, in some applications, the use of polysiloxanes is strictly limited or even prohibited. One possible solution to this problem is to bond the polysiloxane covalently directly to the binder, for example polyester or polyether, to produce a copolymer. An example is the Silikopur 8080 product from Evonik.

Another class of polysiloxanes used in aqueous coatings are the aminosiloxanes. Too high a concentration of the aminosiloxane, however, may lead to instability and flocculation of the binder. Incorporating such aminosiloxanes into aqueous coating compositions additionally requires strict compliance with a pH of between 5 and 7.

Another disadvantage of aminosiloxanes is the fact that the amino group catalyses the decomposition of the polysiloxane chain. Short-chain siloxane oligomers are formed, and then are lost through evaporation, and the additive loses its effect.

It is noted that citation or identification of any document in this application is not an admission that such document is available as prior art to the present invention.

It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

OBJECT OF THE INVENTION

It was an object of the invention to provide new coating compositions with outstanding properties in terms of processability and performance qualities, with at least one of the aforementioned disadvantages of the prior art being overcome.

SUMMARY OF THE INVENTION

Surprisingly it has been found that admixtures of polysiloxanes carrying quaternary ammonium groups to coating compositions are able to achieve the object posed by the invention.

The present invention accordingly provides a curable coating composition comprising at least one linear or cyclic polysiloxane containing at least one quaternary ammonium group.

The present invention further provides a process for producing a coating composition using a microemulsion.

The present invention additionally provides a process for producing a coating.

An advantage of the present invention is that the polysiloxanes modified with quaternary ammonium groups exhibit very high compatibility in the coating system.

An advantage of the present invention is that in contrast to coating compositions additised with aminosiloxanes, the coating compositions which have been additised with polysiloxanes modified with quaternary ammonium groups are stable even at pH levels of more than 7.

An advantage of the present invention is that in contrast to coating compositions additised with aminosiloxanes, the coating compositions which have been additised with polysiloxanes modified with quaternary ammonium groups have excellent long-term stability without loss of the effect of the polysiloxane.

An advantage of the present invention is that the coating compositions are water-dilutable with no substantial increase in the viscosity of the coating compositions.

A further advantage of the present invention is that the obtainable coatings exhibit a reduced slip value.

A further advantage of the present invention is that the obtainable coatings exhibit a reduced soiling tendency.

A further advantage of the present invention is that the obtainable coatings have an increased hydrophobicity.

Another advantage of the present invention is that the obtainable coatings exhibit an increased rubfastness.

A further advantage of the present invention is that the obtainable coatings exhibit an improved wet crease resistance.

A further advantage of the present invention is that the obtainable coatings exhibit an increased flexibility.

A further advantage of the present invention is that the obtainable coatings exhibit an increased scratch resistance.

Another advantage of the present invention is that the obtainable coatings have a relatively low foam tendency.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention provides a
curable coating composition comprising
A) at least one linear or cyclic, preferably linear, polysiloxane containing at least one quaternary ammonium group, particular preference being given to linear polysiloxanes in which the at least one quaternary ammonium group is in α,ω-position.

The term "quaternary ammonium group" in the sense of the present invention represents a univalently positively charged group with a tetravalent nitrogen.

As an example, the following general formula may be given

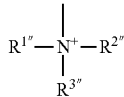

where $R^{1''}$, $R^{2''}$ and $R^{3''}$ independently at each occurrence are identical or different, branched or unbranched, optionally substituted hydrocarbon radicals which optionally contain ester, amide or ether functions.

The term "linear polysiloxane" in the sense of the present invention refers to a polysiloxane which is not branched in its SiO chain.

The term "cyclic polysiloxane" in the sense of the present invention refers to a polysiloxane which is circular in its SiO chain.

Unless stated otherwise, all of the stated percentages (%) are percent by mass.

All conditions such as, for example, pressure and temperature are standard conditions unless otherwise stated.

Inventively preferred coating compositions of the present invention are characterized in that the polysiloxane is selected from the group of polysiloxanes of the general formula I)

$M_a M'_{a1} M''_{a2} M'''_{a3} D_b$      general formula I)

where
$M=(R^1{}_3 SiO_{1/2})$
$M'=(R^2 R^1{}_2 SiO_{1/2})$
$M''=(R^3 R^1{}_2 SiO_{1/2})$
$M'''=(R^4 R^1{}_2 SiO_{1/2})$
$D=(R^1{}_2 SiO_{2/2})$
a=0 to 1;
a1=0 to 1;
a2=0 to 1;
a3=0 to 2, preferably 2;

with the proviso that
a+a1+a2+a3=2;
b=1 to 500, preferably 10 to 400, more preferably 20 to 300;
$R^1$ independently at each occurrence is identical or different linear or branched, optionally aromatic hydrocarbon radicals having 1 to 30 carbon atoms, preferably methyl or phenyl, in particular methyl;
$R^2$ independently at each occurrence is identical or different alkoxy or acyloxy radicals, such as, for example, methoxy, ethoxy, n-propoxy or isopropoxy radicals, acetoxy, hydroxyl, in particular ethoxy or isopropoxy radicals;
$R^3$ independently at each occurrence is identical or different organic epoxy radicals;
$R^4$ independently at each occurrence is identical or different organic radicals which carry quaternary ammonium functions.

Suitable epoxy radicals $R^3$ are, for example, preferably identical or different radicals selected from the group

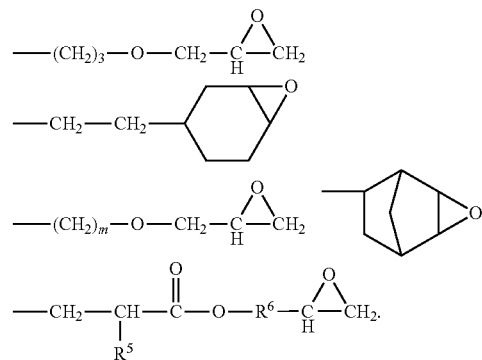

where $R^5$ are identical or different radicals from the group of hydrogen or alkyl having 1 to 6 C atoms, preferably methyl, and
$R^6$ are identical or different divalent hydrocarbon radicals which optionally contain ether functions, preferably methylene.

Suitable radicals $R^4$ are, for example, groups with the structure $—R^7—R^8$, in which
$R^7$ are preferably identical or different divalent radicals selected from the group

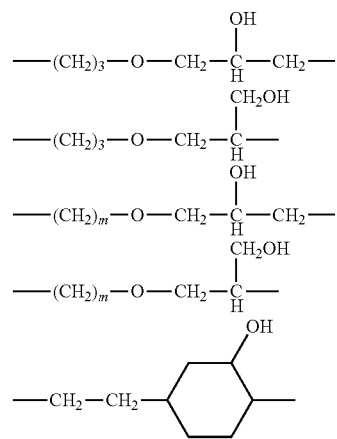

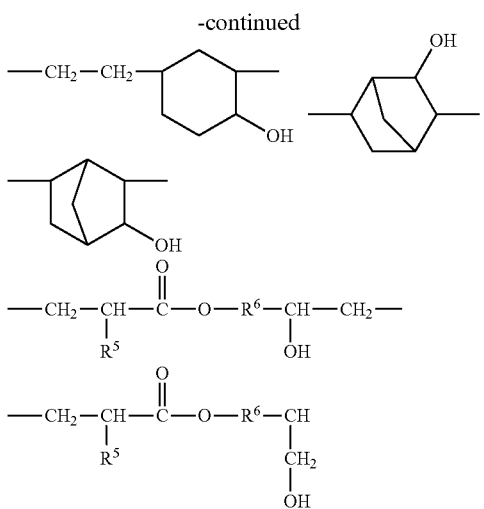

where m=2 to 18,
$R^5$ are identical or different radicals from the group of hydrogen or alkyl having 1 to 6 C atoms, preferably methyl;
$R^6$ are identical or different divalent hydrocarbon radicals which optionally contain ether functions, preferably methylene, and
$R^8$ is selected from the group consisting of

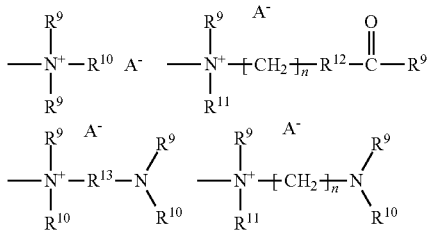

where
$R^9$, $R^{10}$, $R^{11}$ are in each case independently of one another alkyl radicals having 1 to 30 C atoms, or radicals of the formula

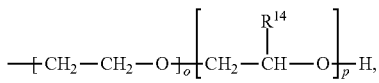

where
o=0 to 30, preferably 0 to 10, more particularly 1 to 3,
p=0 to 30, preferably 0 to 10, and
$R^{14}$ are identical or different alkyl, aryl or alkaryl radicals having 1 to 30 C atoms, which optionally contain ether functions, preferably methyl, ethyl or phenyl, more particularly methyl;
$R^{12}$ are identical or different radicals from the group
—O—; —$NR^{15}$—,
where $R^{15}$ are identical or different radicals from the group of hydrogen or alkyl having 1 to 6 C atoms;
$R^{13}$ are identical or different, optionally branched, divalent hydrocarbon radicals, preferably ethylene or propylene;
n=2 to 18, preferably 3, and
A—are identical or different counterions to the positive charges on the quaternary nitrogen groups, selected from inorganic or organic anions of the acids HA, and also derivatives thereof.

In a further preferred embodiment of the present invention, the counterion $A^-$ to the positive charges on the quaternary nitrogen groups consists of the anion of a physiologically tolerated acid HA, which with particular preference is selected from acetic acid, L-hydroxycarboxylic acids, more particularly lactic acid, or aromatic carboxylic acids.

Further preferred counterions originate from common quaternising agents. These are, in particular, ethyl sulphate, methyl sulphate, toluene sulphonate, chloride and bromide.

If the quaternary nitrogen groups in the polysiloxanes of the general formula (I) are designated A, and the polysiloxane blocks are designated B, then the polysiloxanes of the general formula (I) that are present in accordance with the invention are polymeric compounds of the structure ABA.

It is a familiar concept to the skilled person that the compounds are present in the form of a mixture having a distribution which is governed substantially by laws of statistics.

Corresponding preparation processes for the above-described polysiloxanes of the general formula I) are found in EP0294642.

The fraction of component A) in the coating composition of the invention is 0.01 to 5 wt %, more particularly 0.05 to 2 wt %, based on the coating composition.

Preferred coating compositions of the invention are coating compositions curable by light, more particularly UV light, or coating compositions curable by drying.

Preferred coating compositions of the invention are aqueous coating compositions, and thus contain at least 20 wt %, more particularly at least 40 wt %, of water, the weight figures being based on the total coating composition.

Furthermore, the coating composition of the invention may optionally comprise one or more binder components B). Suitable in principle as binder components are all kinds of binders known to the skilled person, these being especially suitable for aqueous coating compositions, examples including thermoplastic binders, which accordingly are not crosslinkable, with an average molecular weight of usually >10 000 g/mol.

A review of such binders can be found in, for example, the 2001 publication "Lehrbuch der Lacke and Beschichtungen", Part 3: "Bindemittel für wasserverdünnbare Systeme", second edition, by H. Kittel.

Preferred coating compositions of the invention comprise at least one component B) selected form the group consisting of water-dispersible polyester, alkyd, maleate, epoxy and phenol-formaldehyde resins, melamine-formaldehyde resins (also called amino resins), water-dispersible acrylic and methacrylic copolymers, aqueous dispersions of polymers of ethylenically unsaturated compounds such as, for example, styrene, butadiene, acrylates, methacrylates, ethylene, vinyl chloride, and vinyl alcohol esters, aqueous polyurethane and polyurea dispersions, aqueous silicone resin, epoxy resin and epoxy acrylate dispersions, and bitumen emulsions.

The coating composition preferably has, as component B), aqueous polyurethane dispersions, of the kind available for example under the trade name "Bayderm" from Lanxess or under the trade name "Aqualen" from Clariant. Such polyurethane dispersions are available as non-post-crosslinkable dispersions, also known as 1K-PU dispersions, or as post-crosslinkable systems. The post-crosslinking in the case of post-crosslinkable systems may take place chemically, by addition of a suitable crosslinker and/or catalyst shortly prior to processing; thermally, by reaction of groups which are unreactive at room temperature and are incorporated covalently in the binder; or by radiation. In the latter case, the intention is for groups incorporated in the polymer framework, ethylenically unsaturated groups for example, to react with one another as a result of radiation, possibly under the influence of an initiator.

The preparation of polyurethane dispersions is state of the art. It is described in, for example, the following specifications:

EP228003A1, page 3, line 24 to page 5, line 46
EP634431A1, page 3, line 38 to page 8, line 9
WO92/15405, page 2, line 35 to page 10, line 32
WO2012/130711A2, page 2, line 9 to page 12, line 4.

The preparation of radiation-curing, or thermally post-crosslinkable polyurethane dispersions is likewise state of the art. It is described in, for example, the following specifications:

DE10114689A1, page 2, paragraph 0017 to page 22, paragraph 103
DE102009008950A1, page 3, paragraph 0017 to page 9, paragraph 0071

The fraction of component B) in the coating composition of the invention is in particular 1 wt % to 80 wt %, based on the total coating composition, more particularly 5 wt % to 60 wt %.

The mass ratio of component A) to component B) in the coating composition of the invention is preferably 1:500 to 1:10.

The coating composition may comprise additional crosslinkers, examples being melamine resins, urea resins, epoxy resins, (poly)glycidyl ethers, (poly)isocyanates, (poly)isocyanurates, (poly)aziridines, (poly)carbodiimides, (poly)siloxanes, ketoesters, ketoamides, 1,3-diketones and ketomethylenearyl compounds. The coating composition may comprise pigments and fillers (e.g. finely ground quartz, precipitated or fumed silica, chalk, titanium dioxide). Furthermore, the emulsions may also be admixed with auxiliaries known from the literature and from the prior art. These include, for example, rheological additives (e.g. polyurethane thickeners, xanthan gum, carob flour, carboxymethylcellulose, polyacrylates, polyvinyl alcohol, polyvinylpyrrolidone, carboxyvinyl polymers, hydroxyethylcellulose and polyethylenimines), (partly) water-miscible organic solvents (e.g. glycols and glycol ethers of the kind available, for example, under the trade name Dowanol from Dow, alcohols, glycerol, polyethylene glycol). Further examples are antimicrobial and preservative substances (e.g. methylisothiazolinones, benzisothiazolinones), wetting agents (e.g. trisiloxanes, 2,4,7,9-tetramethyl-5-decyne-4,7-diol), antioxidants, dispersants, defoamers and deaerating agents, anti-freeze agents, algicides, fungicides, adhesion promoters and/or reactive diluents and also plasticizers (e.g. phthalates, benzoates, phosphate plasticizers) and complexing agents (e.g. EDTA, citric acid and etidronic acid, and also salts thereof). Light stabilizers, radical scavengers, UV absorbers (e.g. benzophenone derivatives, benzotriazole derivatives, cinnamic esters or particulate UV absorbers such as ZnO or $TiO_2$, for example and also further stabilizers may also be added to the coating compositions.

The present invention further provides a process for producing curable coating compositions, comprising the process steps of 1.) providing an aqueous emulsion, more particularly a microemulsion, comprising at least one linear or cyclic, preferably linear, polysiloxane containing at least one quaternary ammonium group, particular preference being given to linear polysiloxanes in which the at least one quaternary ammonium group is in $\alpha,\omega$-position, and 2.) introducing the aqueous emulsion into a curable coating composition.

The term "aqueous emulsion" in connection with the present invention refers to an emulsion which comprises at least 5 wt %, preferably 10 wt %, more preferably 15 wt % of water, based on the total emulsion.

In accordance with the invention the polysiloxanes are incorporated preferably in the form of microemulsions. For the present invention, microemulsions of this kind that are used are those comprising the aforementioned polysiloxanes with preference as a component authoritatively forming the oil phase.

Microemulsions used in accordance with the invention are characterized in that they preferably comprise at least one of the components selected from
a) at least one nonionic surfactant,
b) at least one cosurfactant selected from the group comprising, preferably consisting of, anionic, cationic and amphoteric surfactants,
and
c) water.

Microemulsions used in accordance with the invention are characterized in that they comprise at least one of the components a) and c) or b) and c) or a) and b) and c).

Preferred nonionic surfactants are selected from the group comprising, preferably consisting of, linear or branched synthetic alcohols and carboxylic acids and natural fatty alcohols, fatty acids, fatty acid amides, fatty amines, alkylphenols and adducts thereof with ethylene oxide, styrene oxide and/or propylene oxide, 2,4,7,9-tetramethyl-5-decyne-4,7-diol and the adducts thereof with ethylene oxide and/or propylene oxide, block copolymers of ethylene oxide and propylene oxide, hydrosilylation products of block copolymers of ethylene oxide and propylene oxide, prepared starting from allyl alcohol, and of cyclic, branched or linear hydrogensiloxanes, tri-, tetra- and pentasiloxane surfactants, adducts of ethylene oxide, styrene oxide and/or propylene oxide with fluorotelomer alcohols, organomodified siloxanes (available for example under the name TWIN® from Evonik Industries), partial ethers based on linear, branched, unsaturated and/or saturated alkyl groups and glycerol, glycerol monoesters and diesters and sorbitan monoesters and diesters of saturated and unsaturated fatty acids and the adducts thereof with ethylene oxide, alkyl mono- and -oligoglycosides and the adducts thereof with ethylene oxide, adducts of ethylene oxide with castor oil and/or hydrogenated castor oil, partial esters based on linear, branched, unsaturated and/or saturated fatty acids, ricinoleic acid, 12-hydroxystearic acid, glycerol, polyglycerol, pentaerythritol, dipentaerythritol and sugar alcohols (e.g. sorbitol), alkylglucosides (e.g. methylglucoside, butylglucoside, laurylglucoside) and also polyglucosides (e.g. cellulose), mono-, di- and trialkyl phosphates and also mono-, di- and/or tri-PEG-alkyl phosphates and their salts, citric esters such as glyceryl stearate citrate, glyceryl oleate citrate and dilauryl citrate, for example, and also glyceryl caprylate, polyglyceryl caprylates and polyglyceryl caprates, and also alkoxylated triglycerides, mixed ethers and mixed formals, optionally partially oxidized alkyloligoglycosides or alkenyloligoglycosides or glucuronic acid derivatives, fatty acid N alkylglucamides, protein hydrolysates (especially wheat-based plant products), polyol fatty acid esters, sugar esters, polysorbates and amine oxides, and mixtures of these surfactants.

Further nonionic surfactants are selected from the group consisting of glycerol monoesters and diesters and sorbitan monoesters and diesters of saturated and unsaturated fatty acids, alkyl mono- and -oligoglycosides, partial esters based on linear, branched, unsaturated and/or saturated fatty acids, ricinoleic acid and also 12-hydroxystearic acid and glycerol, polyglycerol, pentaerythritol, dipentaerythritol, sugar alcohols (e.g. sorbitol), alkylglucosides (e.g. methylglucoside, butylglucoside, laurylglucoside) and also polyglucosides (e.g. cellulose), mono-, di- and trialkyl phosphates and their salts, citric esters such as, for example, glyceryl stearate citrate, glyceryl oleate citrate and dilauryl citrate and also glyceryl caprylate, polyglyceryl caprylates, polyglyceryl caprates, and mixtures of these surfactants.

Where the nonionic surfactants contain polyglycol ether chains, they may have a conventional homologue distribution, but preferably a narrowed homologue distribution.

Preferred anionic surfactants are those having a carboxylate, sulphate, sulphonate or phosphate group and a lipophilic radical.

Typical examples of anionic surfactants are soaps, alkylbenzene sulphonates, alkane sulphonates, olefin sulphonates, alkyl ether sulphonates, glycerol ether sulphonates, alpha-methyl ester sulphonates, sulpho fatty acids, alkyl sulphates, alkyl ether sulphates, perfluorinated alkane sulphonates, perfluorinated alkanoic acids, fatty alcohol ether sulphates, glycerol ether sulphates, fatty acid ether sulphates, hydroxyl-mixed ether sulphates, monoglyceride (ether) sulphates, fatty acid amide (ether) sulphates, mono- and dialkylsulphosuccinates, mono- and dialkylsulphosuccinamates, sulphotriglycerides, amide soaps, alkyl ether carboxylates, ether carboxylic acids and their salts, acylsarcosinates, fatty acid isethionates, fatty acid sarcosinates, fatty acid taurides, N-acylamino acids, such as, for example, acyllactylates, acyltartrates, acylglutamates and acylaspartates, alkyloligoglucoside sulphates, protein fatty acid condensates (especially wheat-based plant products) and alkyl (ether) phosphates, and mixtures of these surfactants.

Where the anionic surfactants contain polyglycol ether chains, they may have a conventional distribution, but preferably a narrowed homolog distribution.

Cationic surfactants which can be used are, in particular, quaternary ammonium compounds, more particularly those having at least one linear and/or branched, saturated or unsaturated alkyl chain, as for instance alkyltrimethylammonium halides such as cetyltrimethylammonium chloride or bromide or behenyltrimethyl ammonium chloride, or else dialkyldimethylammonium halides such as distearyldimethylammonium chloride. As cationic surfactants it is additionally possible to use monoalklyamido quats such as palmitamidopropyltrimethylammonium chloride, or corresponding dialkylamido quats.

As cationic surfactants it is additionally possible to use quaternary ester compounds, which may be quaternary fatty acid esters based on mono-, di- or triethanolamine. It is also possible, furthermore, to use alkoxylated and then quaternary fatty amines. Cationic surfactants may further be alkylguanidinium salts.

Typical examples of amphoteric surfactants are amphoacetates, amphopropionates, alkyl betaines, alkylamidobetaines, aminopropionates, aminoglycinates, imidazolinium betaines and sulphobetaines such as the N-alkyl-N,N-dimethylammonium glycinates, for example cocoalkyldimethylammonium glycinate, N-acylaminopropyl-N,N-dimethylammonium glycinates, for example cocoacylaminopropyldimethylammonium glycinate, and 2-alkyl-3-carboxymethyl-3-hydroxyethylimidazolines having in each case 8 to 18 C atoms in the alkyl or acyl group, and also cocoacylaminoethylhydroxyethylcarboxymethyl glycinate. A preferred zwitterionic surfactant is the fatty acid amide derivative known under the INCI name Cocamidopropyl Betaine.

Since the presence of a solvent may simplify the process of preparing the microemulsions, microemulsions of the present invention therefore employed with preference are characterized by additionally comprising a solvent, more particularly an organic solvent, d).

This solvent is preferably partly or wholly water-miscible, the term "partly water-miscible" referring to a solubility at 25° C. and 1 bar of pressure of at least 1 wt % of the solvent in water, based on the total solution. Preferred solvents are selected from the group comprising, preferably consisting of, hydrotropes, for example from the group of the aliphatic, linear and branched alcohols, such as ethanol, propanol, n-butanol, n-pentanol or 1,3-propanediol, cyclic carbonates such as ethylene carbonate, propylene carbonate, glycerol carbonate, esters of monocarboxylic or polycarboxylic acids such as ethyl acetate, ethyl lactate, glycerol, isopropyl alcohol, dipropylene glycol, glycol ethers (available for example under the name DOWANOL® from Dow Chemicals), glycol ether acetates such as, for example, methoxypropyl acetate, aldehydes such as, for example, n-butyraldehyde, ketones such as, for example, acetone, methyl ethyl ketone and cyclohexanone, polyethylene glycol monomethyl and dimethyl ethers, polyethers prepared starting from allyl alcohol and butyl alcohol, and the monomethyl ethers thereof, or polyols. Polyols which are contemplated here may possess 2 to 15 carbon atoms and at least two hydroxyl groups. Typical examples are: glycerol, alkylene glycols, as for example ethylene glycol, diethylene glycol, propylene glycol, dipropylene glycol, butylene glycol, pentylene glycol, hexylene glycol, 1,2-propanediol, 1,2-butanediol, 1,2-pentanediol, 1,2-hexanediol and also polyethylene glycol or polypropylene glycol, polyhydroxycarboxylic acids, butyl glycol, butyl diglycol, neopentyl glycol and mixtures of these solvents.

The oil phase of the microemulsion used in accordance with the invention may further comprise a component e), oil or oil mixture, which is preferably selected from the group comprising, preferably consisting of, propylene glycol, monocaprylates, monoesters or diesters of linear and/or branched monocarboxylic and/or dicarboxylic acids having 2 to 44 C atoms with linear and/or branched, saturated or unsaturated alcohols having 1 to 22 C atoms; and also esterification products of aliphatic, mono- or difunctional alcohols having 2 to 36 C atoms with monofunctional aliphatic carboxylic acids having 1 to 22 C atoms, long-chain aryl acid esters of linear or branched, saturated or unsaturated alcohols having 1 to 22 C atoms, or else isostearyl benzoate or octyldodecyl benzoate, monoesters (such as the methyl esters and isopropyl esters of fatty acids having 12 to 22 C atoms, such as methyl laurate, methyl stearate, methyl oleate, methyl erucate, isopropyl palmitate, isopropyl myristate, isopropyl stearate, isopropyl oleate, n-butyl stearate, n-hexyl laurate, n-decyl oleate, isooctyl stearate, isononyl palmitate, isononyl isononanoate, 2-ethylhexyl palmitate, 2-ethylhexyl laurate, 2 hexyldecyl stearate, 2-octyldodecyl palmitate, oleyl oleate, oleyl erucate, erucyl oleate) and also esters obtainable from technical aliphatic alcohol fractions and technical aliphatic carboxylic acid mixtures; and also naturally occurring monoester mixtures and/or wax ester mixtures, of the kind present in jojoba oil or in sperm oil, for example. Suitable dicarboxylic esters are, for example di-n-butyl adipate, di-n- butyl sebacate, di(2-ethylhexyl) adipate, di(2-hexyldecyl) succinate, diisotridecyl azelate. Suitable diol esters are, for example ethylene glycol dioleate, ethylene glycol diisotridecanoate, propylene glycol di(2-ethylhexanoate), butanediol diisostearate, butanediol dicaprylate/caprate and neopentyl glycol dicaprylate. Examples of other fatty acid esters which can be used are C12-15 alkyl benzoate, dicaprylyl carbonate, diethylhexyl carbonate. As oil component it is also possible to employ longer-chain triglycerides, i.e. triple esters of glycerol with three acid molecules, of which at least one is a relatively long-chain molecule; and also linear, branched and cyclic hydrocarbons such as alkanes, light spirit, white spirit, Kristall oil, white oil, mineral oil, kerosene, terpentine oil, cyclohexane, decahydronaphthalene, and in particular liquid paraffins and isoparaffins (available for example under the name Isopar® from ExxonMobil Chemical) such as liquid paraffin, isohexadecane, polydecene, petroleum jelly, paraffinum perliquidum, squalane, ceresin; aromatic hydrocarbons such as, for example, toluene, xylene and naphthenic oils (available for example under the name SOLVESSO® from ExxonMobil Chemical); and also linear or branched alcohols and fatty alcohols having 6 or more carbon atoms, for example n-hexanol, n-octanol, oleyl alcohol or octyldodecanol and fatty alcohol ethers such as dicaprylyl ether; silicone oils and silicone waxes such as polydimethylsiloxanes, cyclomethylsiloxanes, and also aryl- or alkyl- or alkoxy-substituted polymethylsiloxanes or cyclomethylsiloxanes, Guerbet alcohols based on fatty alcohols having 6 to 18, preferably 8 to 10, carbon atoms, esters of linear C6-C22 fatty acids with linear C6-C22 fatty alcohols, esters of branched C6-C13 carboxylic acids with linear C6-C22 fatty alcohols, esters of linear C6-C22 fatty acids with branched C8-C18 alcohols, especially 2-ethylhexanol or isononanol, esters of branched C6-C13 carboxylic acids with branched alcohols, especially 2-ethylhexanol or isononanol, esters of linear and/or branched fatty acids with polyhydric alcohols (such as propylene glycol, dimer diol or trimer triol, for example) and/or Guerbet alcohols, triglycerides based on C6-C10 fatty acids, liquid mono-/di-/triglyceride mixtures based on C6-C18 fatty acids, esters of C6-C22 fatty alcohols and/or Guerbet alcohols with aromatic carboxylic acids, especially benzoic acid, vegetable oils, branched primary alcohols, substituted cyclohexanes, linear C6-C22 fatty alcohol carbonates, Guerbet carbonates, esters of benzoic acid with linear and/or branched C6-C22 alcohols (e.g. Finsolv™ TN), dialkyl ethers, ring opening products of epoxidized fatty acid esters with polyols, silicone oils and/or aliphatic and/or naphthenic hydrocarbons.

In this connection, the proviso holds that component e) accounts for not more than 50 wt % of the total oil phase consisting of polysiloxane containing at least one quaternary ammonium group and e).

The water phase of the microemulsion used in accordance with the invention may further comprise a component f), at least one salt. The cation of the salt is preferably selected from the group comprising, preferably consisting of, alkali metal ions (such as sodium), alkaline earth metal ions (such as magnesium), quaternary nitrogen-containing ions (e.g. ammonium, tetramethylammonium), transition metal ions (e.g. iron) and aluminium. The anion of the salt is preferably selected from the group comprising, preferably consisting of, hydroxide, oxide, fluoride, chloride, bromide, iodide, sulphide, sulphonate, hydrogensulphate and sulphate, hydrogencarbonate and carbonate, monohydrogenphosphate, dihydrogenphosphate and phosphate, nitrate, and the anions of organic acids (such as acetate and lactate, for example).

Microemulsions used with preference in accordance with the invention comprise the polysiloxane containing at least one quaternary ammonium group in an amount of 10 wt % to 60 wt %, preferably in an amount of 15 wt % to 50 wt %, more preferably in an amount of 20 wt % to 45 wt %, the wt % figures being based on the total microemulsion.

Microemulsions of the present invention that are used with particular preference are characterized in that they comprise the polysiloxane containing at least one quaternary ammonium group in an amount of 10 wt % to 60 wt %, preferably in an amount of 15 wt % to 50 wt %, more preferably in an amount of 18 wt % to 45 wt %, component a) in an amount of 3 wt % to 40 wt %, preferably in an amount of 4 wt % to 20 wt %, more preferably in an amount of 5 wt % to 15 wt %, component b) in an amount of 0 wt % to 30 wt %, preferably in an amount of 3 wt % to 25 wt %, more preferably in an amount of 5 wt % to 20 wt %, component c) in an amount of 10 wt % to 75 wt %, preferably in an amount of 15 wt % to 65 wt %, more preferably in an amount of 20 wt % to 55 wt %, component d) in an amount of 0 wt % to 35 wt %, preferably in an amount of 3 wt % to 30 wt %, more preferably in an amount of 5 wt % to 25 wt %, component e) in an amount of 0 wt % to 50 wt %, preferably in an amount of 1 wt % to 40 wt %, more preferably in an amount of 5 wt % to 20 wt % of the total oil phase consisting of polysiloxane containing at least one quaternary ammonium group and e), component f) in an amount of 0 wt % to 10 wt %, preferably in an amount of 0.01 wt % to 5 wt %, more preferably in an amount of 0.1 wt % to 3 wt %, the wt % data, apart from in the case of component e), being based on the total microemulsion.

Step 1.) of the process of the invention preferably uses microemulsions which comprise polysiloxanes identified above as preferred polysiloxanes present in the coating compositions of the invention.

Curable coating compositions obtainable according to the aforementioned process of the invention are likewise provided by the present invention.

The present invention further relates to a process for producing coatings, comprising the process steps:

1.) providing an aqueous emulsion, more particularly a microemulsion, comprising at least one linear or cyclic polysiloxane containing at least one quaternary ammonium group,
2.) introducing the aqueous emulsion into a curable coating composition,
3.) applying the coating composition to a substrate, and
4.) curing the coating composition.

In its first two steps, the process for producing coatings is identical with the first two steps of the process of the invention for producing coating compositions.

Accordingly, in the process of the invention for producing coatings, preferred subjects of the process of the invention for producing coating compositions are also used with preference.

In process step 3.) of the processes of the invention, the coating composition is applied to an article or substrate. In principle, all surfaces are a suitable substrate. Preferred examples of substrates are textile, paper, rubber, plastic, wood or leather. All of these substrates may already have been coated one or more times, meaning that the coating composition of the invention is applied to an existing coating with which the actual substrate has in turn been coated. The application itself may be accomplished, for example, not only by brushing but also by rolling, roller coating, spraying, flow coating, drawing, dipping, wiping, pouring, knifecoating and spreading.

In process step 4.) of the process of the invention, the coating compositions are dried and—in the case of post-crosslinkable binders—cured.

Physical drying by evaporation of water is accomplished preferably within a temperature range from 0° C. to 200° C., preferably from 10° C. to 100° C., more preferably from 15° C. to 60° C. It may be advantageous to carry out curing by drying with microwaves. Post-crosslinking may be accomplished chemically, by addition of a suitable crosslinker and/or catalyst shortly prior to processing; thermally, by reaction of groups which are unreactive at room temperature and are covalently incorporated in the binder; or by radiation. In the latter case, groups must be incorporated in the polymer framework, ethylenically unsaturated groups for example, which react with one another as a result of radiation, possibly under the influence of a photoinitiator. Examples of suitable crosslinkers and/or catalysts are melamine resins and amino resins, urea resins, epoxy resins, (poly)glycidyl ethers, blocked and non-blocked (poly)isocyanates, (poly)isocyanurates, (poly)aziridines, (poly)carbodiimides, (poly)siloxanes, ketoesters, ketoamides, 1,3-diketones, ketomethylenearyl compounds, diamines and polyamines, diols and polyols, and acids, for example p toluenesulphonic acid. The optimum concentration is dependent on the binder and must be determined individually for each coating formulation. Post-crosslinking may take place either at room temperature or at higher temperatures. In the case of alkyd resins, post-crosslinking is achieved by reaction with atmospheric oxygen, generally under the influence of catalysts ("dryers").

An example of binders which are post-crosslinked thermally are polyurethane dispersions with blocked isocyanate groups. Blocking may come about for example through reaction of the isocyanate group with a blocking agent or by dimerization of the isocyanate groups to form uretdiones. A further, important class of thermally post-crosslinking binders are the melamine-formaldehyde resins, which are baked at relatively high temperatures and undergo post-crosslinking with elimination of, for example, methanol.

In the case of coating compositions curable by light, more particularly UV light, the formulation is admixed with a photoinitiator or a mixture of photoinitiators. The optimum choice of photoinitiator or optimum mixture of photoinitiators and the concentration thereof is dependent on the particular formulation. Preference is given to using 1% to 4% of photoinitiator, based on the overall coating formulation. The reaction takes place at room temperature.

The present invention further provides a coating obtainable by the process of the invention for producing coatings.

The examples listed below illustrate the present invention by way of example, without any intention of restricting the invention, the scope of application of which is apparent from the entirety of the description and the claims, to the embodiments specified in the examples.

BRIEF DESCRIPTION OF THE DRAWING

The following FIGURE is a component of the examples:

FIG. 1 shows Representative slip value measurement curves

OPERATIVE EXAMPLES

The subject matter of the present invention is elucidated in more detail below, without any intention that the subject matter of the invention should be confined to these exemplary embodiments.

Examples

Siloxane 1: Linear Polysiloxane Quat with N=50

1a. Preparation of an Epoxysiloxane

In a 250 ml four-necked flask provided with stirrer, dropping funnel, thermometer and reflux condenser, 12.20 g of allyl glycidyl ether are heated together with 10 ppm of (NH3)2PtCl2 to 115° C. under a nitrogen atmosphere. Added dropwise thereto over the course of 15 minutes are 150 g of an α,ω-hydrogensiloxane of the general formula

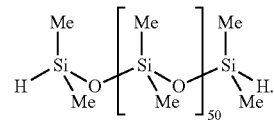

The reaction mixture is stirred for a further 3 hours at 115° C., after which the excess allyl glycidyl ether is distilled off at 0.2 bar and 100° C. Yield: 156 g of an α,ω-diepoxysiloxane (epoxy value: 0.87%) of the general formula

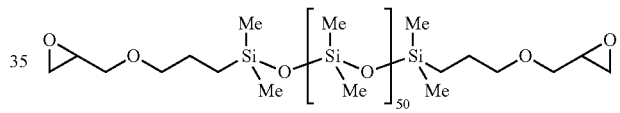

1b. Conversion to the Silicone Quat

In a 250 ml three-necked flask, 17.1 g of 3-N,N-dimethylaminopropyllaurylamide, 3.4 g of acetic acid and 6.3 g of tripropylene glycol monomethyl ether were stirred at room temperature. Subsequently 100 g of the compound prepared according to 1a were added dropwise. The batch was subsequently stirred at 80° C. for 6 hours. Yield: 126 g of polyquaternary polysiloxane polymer, highly viscous yellow liquid, described by the following statistical formula:

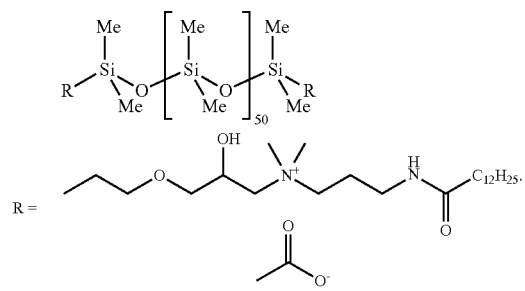

Siloxane 2: Linear Polysiloxane Quat with N=80

2a. Preparation of an Epoxysiloxane

In a 250 ml four-necked flask provided with stirrer, dropping funnel, thermometer and reflux condenser, 8.9 g of allyl glycidyl ether are heated together with 10 ppm of (NH3) 2PtCl2 to 115° C. under a nitrogen atmosphere. Added dropwise thereto over the course of 15 minutes are 152 g of an α,ω-hydrogensiloxane of the general formula

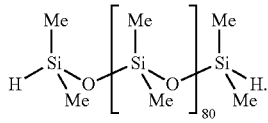

The reaction mixture is stirred for a further 3 hours at 115° C., after which the excess allyl glycidyl ether is distilled off at 0.2 bar and 100° C. Yield: 156 g of an α,ω-diepoxysiloxane (epoxy value: 0.58%) of the general formula

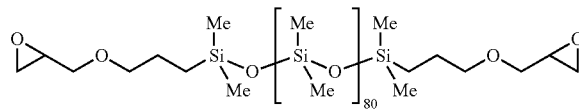

2b. Conversion to the Silicone Quat

In a 250 ml three-necked flask, 13.6 g of 3-N,N-dimethylaminopropyllaurylamide, 2.6 g of acetic acid and 14 g of isopropanol were stirred at room temperature. Subsequently 120 g of the compound prepared according to 2a were added dropwise. The batch was subsequently stirred at 80° C. for 6 hours and distilled. Yield: 136 g of polyquaternary polysiloxane polymer, highly viscose yellow liquid, described by the following statistical formula:

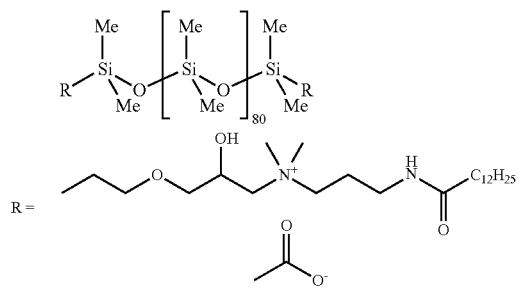

Siloxane 3: Linear Polysiloxane Quat with N=250

3a. Preparation of an Epoxysiloxane

In a 500 ml four-necked flask provided with stirrer, dropping funnel, thermometer and reflux condenser, 9 g of allyl glycidyl ether are heated together with 10 ppm of (NH3) 2PtCl2 to 115° C. under a nitrogen atmosphere. Added dropwise thereto over the course of 15 minutes are 443 g of an α,ω-hydrogensiloxane of the general formula

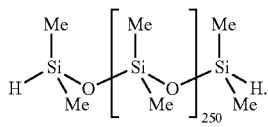

The reaction mixture is stirred for a further 3 hours at 115° C., after which the excess allyl glycidyl ether is distilled off at 0.2 bar and 100° C. Yield: 440 g of an α,ω-diepoxysiloxane (epoxy value: 0.19%) of the general formula

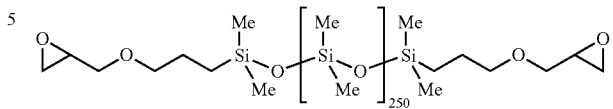

3b. Conversion to the Silicone Quat

In a 500 ml three-necked flask, 16.3 g of 3-N,N-dimethylaminopropyllaurylamide, 5.6 g of lactic acid and 58 g of isopropanol were stirred at room temperature. Subsequently 440 g of the compound prepared according to 3a were added dropwise. The batch was subsequently stirred at 80° C. for 6 hours and distilled. Yield: 461 g of polyquaternary polysiloxane polymer, highly viscose yellow liquid, described by the following statistical formula:

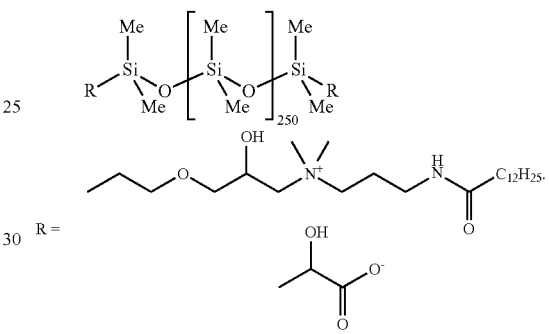

Siloxane 4: Linear Polysiloxane Quat with N=80

4a. Preparation of an Epoxysiloxane

In a 250 ml four-necked flask provided with stirrer, dropping funnel, thermometer and reflux condenser, 8.9 g of allyl glycidyl ether are heated together with 10 ppm of (NH3) 2PtCl2 to 115° C. under a nitrogen atmosphere. Added dropwise thereto over the course of 15 minutes are 152 g of an α,ω-hydrogensiloxane of the general formula

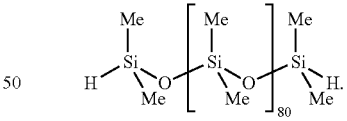

The reaction mixture is stirred for a further 3 hours at 115° C., after which the excess allyl glycidyl ether is distilled off at 0.2 bar and 100° C. Yield: 156 g of an α,ω-diepoxysiloxane (epoxy value: 0.58%) of the general formula

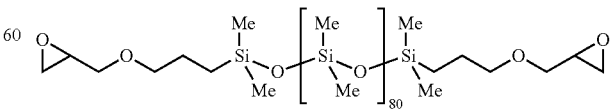

4b. Conversion to the Silicone Quat

In a 250 ml three-necked flask, 10 g of N-(3-dimethylaminopropyl)octadecanamide, 1.7 g of acetic acid and 15 g of isopropanol were stirred at room temperature. Subsequently 73 g of the compound prepared according to 4a were added dropwise. The batch was subsequently stirred at 80° C. for 6 hours and distilled. Yield: 97 g of polyquaternary polysiloxane polymer, highly viscose yellow liquid, described by the following statistical formula:

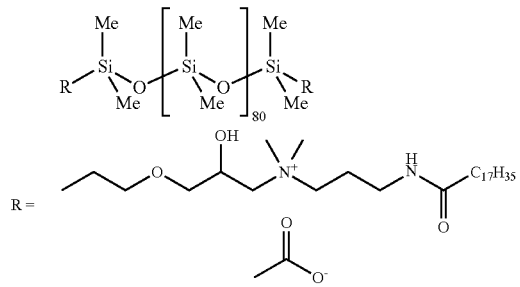

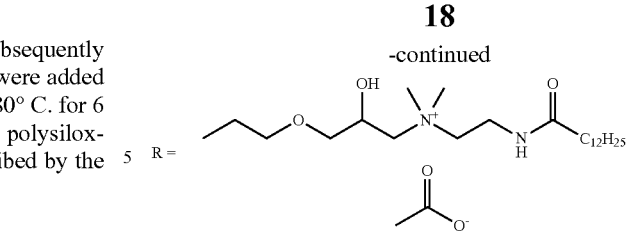

Siloxane 5: Linear Polysiloxane Quat with N=80

5a. Preparation of Epoxysiloxane

In a 250 ml four-necked flask provided with stirrer, dropping funnel, thermometer and reflux condenser, 8.9 g of allyl glycidyl ether are heated together with 10 ppm of (NH3) 2PtCl2 to 115° C. under a nitrogen atmosphere. Added dropwise thereto over the course of 15 minutes are 152 g of an α,ω-hydrogensiloxane of the general formula

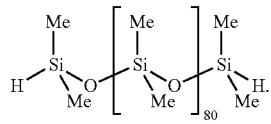

The reaction mixture is stirred for a further 3 hours at 115° C., after which the excess allyl glycidyl ether is distilled off at 0.2 bar and 100° C. Yield: 156 g of an α,ω-diepoxysiloxane (epoxy value: 0.58%) of the general formula

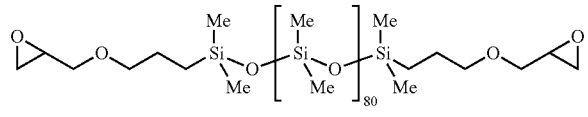

5b. Conversion to the Silicone Quat

In a 250 ml three-necked flask, 7.9 g of 3-N,N-dimethylaminoethyllaurylamide, 1.7 g of acetic acid and 15 g of isopropanol were stirred at room temperature. Subsequently 75 g of the compound prepared according to 5a were added dropwise. The batch was subsequently stirred at 80° C. for 6 hours and distilled. Yield: 98 g of polyquaternary polysiloxane polymer, highly viscose yellow liquid, described by the following statistical formula:

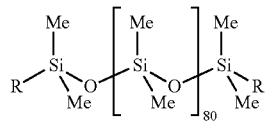

Microemulsions:

| Constituent/wt % | ME1 | ME2 | ME3 | ME4 |
|---|---|---|---|---|
| Siloxane 2 | 20.0 | 22.1 | 19.4 | 21.2 |
| TEGO Alkanol TD6, Evonik Industries (Isotridecyl 6-ethoxylate): | 6.0 | 11.4 | 5.8 | |
| Lutensol TO12, BASF (Isotridecyl 12-ethoxylate) | 6.0 | | 5.8 | |
| Tego Twin 4100, Evonik Industries (organomodified siloxane) | | | 2.9 | |
| Tego Wet 240, Evonik Industries (Trisiloxane) | | | | 10.9 |
| Isopropanol | | | | 4.2 |
| Water | 68.0 | 66.5 | 66.1 | 63.7 |

| Constituent/wt % | ME5 | ME6 | ME7 | ME8 | ME9 |
|---|---|---|---|---|---|
| Siloxane 1 | | 20.4 | | | 30.7 |
| Siloxane 3 | 18.9 | | 22.1 | 38.8 | |
| Tego Alkanol TD6 (Isotridecyl 6-ethoxylate) | 14.8 | 12.0 | 35.4 | 19.1 | 27.6 |
| Isopropanol | 11.5 | 8.4 | | | |
| Dipropylene glycol | | | 11.4 | 15.5 | 15.1 |
| Water | 54.8 | 59.2 | 31.1 | 26.6 | 26.6 |

| Constituent/wt % | ME10 | ME11 | ME12 | ME13 |
|---|---|---|---|---|
| Siloxane 2 | 35.7 | 26.8 | 23.7 | 26.5 |
| Varisoft 300, Evonik Industries (Cetyltrimethylammonium chloride) | 7.3 | 13.6 | 4.7 | 11.0 |
| Dermosoft GMCY, Dr Straetmans (Glyceryl Monocaprylate) | | | 9.6 | |
| Capryol 90, Gattefosse (Propylene Glycol Monocaprylate) | | 5.9 | | 10.5 |
| Butyl diglycol | 3.8 | 13.4 | | |
| Propylene glycol | | | 18.9 | 15.6 |
| Water | 53.2 | 40.3 | 43.1 | 36.4 |

| Constituent/wt % | ME14 | ME15 | ME16 | ME17 |
|---|---|---|---|---|
| Siloxane 2 | 27.4 | 19.8 | 19.7 | 30.0 |
| Betain F50, Evonik Industries (Cocamidopropyl betaine) | 11.4 | | | |
| Tegotens SD100, Evonik Industries (Sorbitan sesquicaprylate) | 5.5 | | | 10.0 |
| Varisoft PATC, Evonik Industries (Palmitamidopropyltrimethyl-ammonium chloride) | | | | 2.0 |
| Imbentin U-050, Kolb (Undecyl 5-ethoxylate) | | 9.2 | 9.4 | |
| Propylene glycol | 8.7 | | | |
| Butyl diglycol | | | | 15.0 |
| Water | 47.0 | 71.0 | 70.9 | 43.0 |

| Constituent/wt % | ME18 | ME19 | ME20 | ME21 |
|---|---|---|---|---|
| Siloxane 4 | | 31.5 | 20.0 | 20.8 |
| Siloxane 5 | 39.0 | | | |
| Tego Alkanol TD6, Evonik Industries (Isotridecyl 6-ethoxylate) | 19.5 | 27.8 | 6.0 | 6.2 |
| Lutensol TO12, BASF (Isotridecyl 12-ethoxylate) | | | 6.0 | 6.0 |
| Tego Twin 4100, Evonik Industries (organomodified siloxane) | | | | 3.2 |
| Dipropylene glycol | 15.6 | 15.1 | | |
| Water | 25.9 | 25.6 | 68.0 | 63.8 |

| Constituent/wt % | ME22 | ME23 |
|---|---|---|
| Siloxane 4 | 24.0 | |
| Siloxane 5 | | 26.0 |
| Varisoft 300, Evonik Industries (Cetyltrimethylammonium chloride) | 5.0 | 11.5 |
| Dermosoft GMCY, Dr Straetmans (Glyceryl Monocaprylate) | 10.0 | |
| Capryol 90, Gattefosse (Propylene Glycol Monocaprylate) | | 10.5 |
| Propylene glycol | 19.0 | 15.6 |
| Water | 42 | 36.4 |

Coating Compositions

Formulation Example 1

Topcoat, Physically Drying

| Constituent | wt % |
|---|---|
| Bayderm Finish 91 DU, Lanxess | 54.0% |
| Water | 45.0% |
| TEGO ® Viskoplus 3030, Evonik Industries | 1.0% |

Formulation Example 2

UV Furniture Varnish, not Physically Drying

| Constituent | wt % |
|---|---|
| Ucecoat 7710, Cytec | 98.0 |
| Irgacure 500, BASF | 2.0 |

Formulation Example 3

Wood Floor Varnish I

| Constituent | wt % |
|---|---|
| APU 10610, Alberdingk Boley | 85.5 |
| Butyl diglycol | 2.0 |
| Dowanol TBnB | 4.0 |
| Water | 8.3 |
| Coatex BR 125 P, Arkema | 0.2 |

Formulation Example 4

Wood Floor Varnish II

| Constituent | wt % |
|---|---|
| AC 2714, Alberdingk Boley | 80.0 |
| Dowanol DPnP | 5.0 |
| Dowanol DPM | 5.0 |
| Water | 9.6 |
| DSX 1514, BASF | 0.4 |

Formulation Example 5

Plastics Basecoat

| Constituent | wt % |
|---|---|
| APU 10120, Alberdingk Boley | 18.0 |
| APU 10160, Alberdingk Boley | 9.0 |
| TEGO Foamex 805 | 0.3 |
| Viscalex HV 30 (4% strength aqueous solution neutralised to pH 8 with AMP90) | 63.4 |
| AMP 90 | 0.3 |
| DI water | 9.0 |

Coatings:

100 grams of coating material together with the additive under test were weighed out into a 180 ml polyethylene beaker (Ø6 cm) and then homogenised by stirring at 1500 rpm for 3 minutes, using a Dispermat with a toothed disc (Ø3 cm). The amounts of additive are always based on the siloxane. After a residence time of 24 hours, the coating material is applied to black, matted PVC film (Leneta® system, 43×28 cm) using a 100 μm wire doctor. The coating is subsequently dried at room temperature for 24 hours. For comparison with the microemulsions of the invention, a standard commercial product called TEGO Glide 410 was used. This is a water-dispersible, organomodified siloxane having an active substance content of 100%. The quality of the drawdowns was scored visually on a scale from 1 to 5 according to the number of defects.

Assessment of Drawdown Quality

| Number of defects | Rating |
|---|---|
| 0-1 | 5 |
| 1-3 | 4 |
| Around 5 | 3 |
| Around 10 | 2 |
| Well above 10 | 1 |

Slip Testing:

The slip values were measured on PVC film using an Instron 3300 instrument (Instron Deutschland GmbH, Pfungstadt, Germany). The instrument measures the force required to pull a carriage over the coated film. The cylindrical carriage, with a weight of 500 grams and a contact surface area of 12.6 cm², was equipped with a felt surface, and this surface was renewed for each measurement. The carriage was subsequently pulled (with increasing force) until it moves at a speed of 6 mm/s. The parameter measured is therefore the pulling force (load) necessary in order to move the carriage.

Anti-Blocking Testing:

The anti-blocking behaviour of formulations 2, 3 and 4 was determined by means of an Osimeter. Two 5×5 cm sections of coated Leneta film were clamped in with the coated sides against one another. The films were subsequently pressed against one another with a pressure of 70 Kp per 25 cm². The Osimeter thereafter was placed, together with the films, in an oven at 50° C. for 24 hours. The films are subsequently parted from one another. The anti-blocking is evaluated on a scale from 1 to 5 on the basis of the ease with which the films can be parted and the damage to the coating surfaces. An undamaged surface without noticeable blocking was evaluated with a rating of 5. In contrast, a highly damaged surface and severe blocking was rated with 1.

Compilation of Results
Topcoat, Physically Drying:

| Additive | % | Drawdown | Slip/cN | Stick-slip | Feel |
|---|---|---|---|---|---|
| Blank: | — | 5 | 260 | Yes | Rubber-like |
| ME1 | 0.3 | 4 | 119 | No | Velvety |
| ME3 | 0.3 | 5 | 123 | No | Velvety |
| ME1 | 0.6 | 3 | 118 | No | Velvety |
| ME3 | 0.6 | 5 | 121 | No | Velvety |
| ME6 | 0.3 | 4 | 145 | No | Velvety |
| ME6 | 0.6 | 4 | 139 | No | Velvety |
| ME7 | 0.3 | 5 | 112 | No | Velvety |
| ME7 | 0.6 | 4 | 109 | No | Velvety |
| ME18 | 0.3 | 5 | 125 | No | Velvety |
| ME18 | 0.6 | 3 | 119 | No | Velvety |
| ME20 | 0.3 | 4 | 117 | No | Velvety |
| ME20 | 0.6 | 4 | 118 | No | Velvety |

The addition of 0.3% to 0.6% of samples ME1, ME3, ME6, ME7, ME18 or ME20, based on active substance content, leads to a distinct reduction in the slip values. The blank exhibits stick-slip, i.e. a regular fluctuation in the pulling load. The additised samples, in contrast, do not exhibit this phenomenon. FIG. 1 shows a number of representative measurement curves. The quality of the drawdown of the sample with ME3 is comparable with the blank. To assess the feel, an experienced test operative made a qualitative evaluation of the coatings drawn down on to Leneta. The tester identifies sample 1 as rubber-like. The samples additised with a microemulsion, in contrast, are perceived to be velvety.

UV Furniture Varnish, not Physically Drying:

| Additive | % AS | Drawdown | Slip/cN | Anti-blocking |
|---|---|---|---|---|
| Blank: | — | 3 | 368 | 3 |
| Glide 410 | 0.3 | 3-4 | 54 | 4 |
| ME 1 | 0.3 | 2 | 38 | 5 |

The addition of 0.3% of the sample ME1 leads to a very sharp reduction in the slip values and to an improvement in the anti-blocking, with respect both to the blank and to the non-inventive reference product Glide 410.

Wood Floor Varnish I:

| Additive | % AS | Drawdown | Slip/cN | Anti-blocking |
|---|---|---|---|---|
| Blank: | — | 4 | 159 | 3 |
| Glide 410 | 0.3 | 4 | 128 | 3 |
| ME 1 | 0.3 | 4 | 110 | 4 |

The addition of 0.3% of the sample ME1 leads to a reduction in the slip values and to an improvement in the anti-blocking, with respect both to the blank and to the non-inventive reference product Glide 410.

Wood Floor Varnish II:

| Additive | % AS | Drawdown | Slip/cN | Anti-blocking |
|---|---|---|---|---|
| Blank: | — | 3-4 | 262 | 4 |
| Glide 410 | 0.3 | 4 | 90 | 4 |
| ME 1 | 0.3 | 3 | 90 | 5 |

The addition of 0.3% of the sample ME1 leads to a reduction in the slip values in comparison with the blank sample, and to an improvement in the anti-blocking, with respect both to the blank and to the non-inventive reference product Glide 410.

Plastics Basecoat:

| Additive | % AS | Drawdown | Slip/cN |
|---|---|---|---|
| Blank: | — | 5 | 262 |
| Glide 410 | 0.1 | 4-5 | 181 |
| Glide 410 | 0.5 | 4-5 | 108 |
| ME 1 | 0.1 | 4 | 146 |
| ME 1 | 0.5 | 4 | 95 |

The addition of either 0.1% or 0.5% of the sample ME1 leads to a reduction in the slip values in comparison both to the blank and to the non-inventive reference product Glide 410.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the invention as defined in the following claims.

The invention claimed is:

1. A curable coating composition comprising:
   at least one linear polysiloxane containing at least one quaternary ammonium group; and
   one or more binder components;
   wherein the polysiloxane is selected from the group of polysiloxanes of the general formula I:

$$M_a M'_{a1} M''_{a2} M'''_{a3} D_b \quad \text{general formula I;}$$

where:
   $M = (R^1{}_3 SiO_{1/2})$;
   $M' = (R^2 R^1{}_2 SiO_{1/2})$;
   $M'' = (R^3 R^1{}_2 SiO_{1/2})$;
   $M''' = (R^4 R^1{}_2 SiO_{1/2})$;
   $D = (R^1{}_2 SiO_{2/2})$;
   $a = 0$ to $1$;
   $a1 = 0$ to $1$;
   $a2 = 0$ to $1$; and
   $a3 = >0$ to $2$;
   with the proviso that:
   $a + a1 + a2 + a3 = 2$; and
   where:
   $b = 1$ to $500$;
   $R^1$ independently at each occurrence is identical or different linear or branched, optionally aromatic hydrocarbon radicals having 1 to 30 carbon atoms;
   $R^2$ independently at each occurrence is identical or different alkoxy or acyloxy radicals, such as, methoxy, ethoxy, n-propoxy or isopropoxy radicals, acetoxy, hydroxyl;

$R^3$ independently at each occurrence is identical or different organic epoxy radicals; and $R^4$ independently at each occurrence is identical or different organic radicals which carry quaternary ammonium functions.

2. A curable coating composition comprising:

at least one linear polysiloxane containing at least one quaternary ammonium group; and one or more binder components selected from the group consisting of:

water-dispersible polyester, alkyd, maleate, epoxy and phenol-formaldehyde resins, melamine-formaldehyde resins, water-dispersible acrylic and methacrylic copolymers, aqueous dispersions of polymers of ethylenically unsaturated compounds such as, styrene, butadiene, acrylates, methacrylates, ethylene, vinyl chloride, and vinyl alcohol esters, aqueous polyurethane and polyurea dispersions, aqueous silicone resin, epoxy resin and epoxy acrylate dispersions, and bitumen emulsions.

3. The coating composition according to claim 1;

wherein the fraction of the binder component is 1 wt % to 80 wt %, based on the coating composition.

4. A process for producing curable coating compositions, comprising the process steps of:

1.) providing an aqueous emulsion comprising at least one linear polysiloxane containing at least one quaternary ammonium group; and 2.) introducing the aqueous emulsion into a curable coating composition.

5. The process according to claim 4;

wherein the aqueous emulsion used is a microemulsion which comprises:

the polysiloxane containing at least one quaternary ammonium group, in an amount of 10 wt % to 60 wt %;

a) a nonionic surfactant in an amount of 3 wt % to 40 wt %;

b) a cosurfactant selected from the group containing anionic, cationic and amphoteric surfactants, in an amount of 0 wt % to 30 wt %;

c) water in an amount of 10 wt % to 75 wt %;

d) solvent in an amount of 0 wt % to 35 wt %;

e) an oil or oil mixture in an amount of 0 wt % to 50 wt % of the total oil phase consisting of polysiloxane containing at least one quaternary ammonium group and e); and f) at least one salt in an amount of 0 wt % to 10 wt %;

wherein the wt % figures, except in the case of component e), are based on the total microemulsion.

6. The process according to claim 4;

wherein the microemulsion used comprises at least one linear polysiloxane in which the at least one quaternary ammonium group is in $\alpha,\omega$-position.

7. A curable coating composition obtained by the process according to claim 4.

8. A process for producing coatings, comprising the process steps of:

1.) providing an aqueous emulsion comprising at least one linear polysiloxane containing at least one quaternary ammonium group;

2.) introducing the aqueous emulsion into a curable coating composition; and

3.) curing the coating composition.

* * * * *